United States Patent
Jain et al.

(10) Patent No.: US 11,846,967 B1
(45) Date of Patent: Dec. 19, 2023

(54) SYSTEM AND METHOD FOR CREATING AT LEAST ONE STEP FOR PROVIDING DIGITAL GUIDANCE TO AN UNDERLYING APPLICATION

(71) Applicant: WHATFIX PRIVATE LIMITED, Bangalore (IN)

(72) Inventors: Aashish Jain, Bangalore (IN); Pushkar Garg, Bangalore (IN); Nipun Phutela, Bangalore (IN)

(73) Assignee: WHATFIX PRIVATE LIMITED, Bangalore (IN)

( * ) Notice: Subject to any disclaimer, the term of this patent is extended or adjusted under 35 U.S.C. 154(b) by 0 days.

(21) Appl. No.: 17/982,633

(22) Filed: Nov. 8, 2022

(51) Int. Cl.
*G06F 3/0482* (2013.01)
*G06F 3/04842* (2022.01)

(52) U.S. Cl.
CPC ........ *G06F 3/0482* (2013.01); *G06F 3/04842* (2013.01)

(58) Field of Classification Search
CPC .................................................... G06F 3/0482
USPC ......................................................... 715/705
See application file for complete search history.

(56) References Cited

U.S. PATENT DOCUMENTS

| | | | | |
|---|---|---|---|---|
| 5,442,759 A * | 8/1995 | Chiang | ............... | G09B 19/0053 718/107 |
| 5,493,658 A * | 2/1996 | Chiang | ............... | G09B 19/0053 715/713 |
| 5,535,422 A * | 7/1996 | Chiang | .................. | G06F 9/453 715/709 |
| 5,823,781 A * | 10/1998 | Hitchcock | .......... | G09B 19/0053 434/323 |
| 8,244,828 B2 * | 8/2012 | Anderson | ................ | H04N 7/16 709/217 |
| 9,448,726 B2 * | 9/2016 | Guckenheimer | ... | G06F 3/04895 |
| 10,476,971 B2 * | 11/2019 | Holmes-Higgin | ... | G06Q 10/103 |
| 10,777,097 B2 * | 9/2020 | Kanuganti | ......... | H04N 21/2743 |
| 11,119,727 B1 * | 9/2021 | Gupta | ..................... | G10L 25/48 |
| 11,280,623 B2 * | 3/2022 | Batta | ...................... | G01C 21/34 |
| 11,669,353 B1 * | 6/2023 | Sanghai | .................. | G06F 9/453 715/705 |
| 11,709,690 B2 * | 7/2023 | Lipka | .................. | G06F 3/04815 715/705 |
| 2003/0073065 A1 * | 4/2003 | Riggs | ..................... | H04L 63/08 434/350 |

(Continued)

*Primary Examiner* — Reza Nabi
(74) *Attorney, Agent, or Firm* — Locke Lord LLP; Tim Tingkang Xia, Esq.

(57) ABSTRACT

A system and method to create at least one step for providing digital guidance to an underlying application is disclosed. The system comprising one or more user devices in communication with a server, the user device comprising a processor configured to: scan the underlying application for identifying one or more elements; select at least one target element; determine neighbouring element in proximity of the target element; analyse elements to determine attributes including unique attributes; classify as a pillar element depending upon presence of unique attributes; determine an intersection element between the target element and the pillar element; and determine path of the intersection element, store path of the intersection element, the path of the intersection element enables identification of the intersection element and based on the intersection element, the pillar element and the target element associated with the intersection element can be identified.

9 Claims, 2 Drawing Sheets

(56) References Cited

U.S. PATENT DOCUMENTS

| | | | |
|---|---|---|---|
| 2003/0074559 A1* | 4/2003 | Riggs | H04L 63/08 |
| | | | 713/168 |
| 2013/0097498 A1* | 4/2013 | Steinberg | G06F 3/0482 |
| | | | 715/708 |
| 2015/0100903 A1* | 4/2015 | Lee | G01C 21/3605 |
| | | | 715/763 |
| 2017/0003983 A1* | 1/2017 | Park | G06F 3/013 |
| 2017/0132019 A1* | 5/2017 | Karashchuk | G06F 3/0482 |
| 2017/0213478 A1* | 7/2017 | Kohn | H04S 7/304 |
| 2018/0129480 A1* | 5/2018 | Germanakos | G06F 8/20 |
| 2020/0043355 A1* | 2/2020 | Kwatra | G06Q 10/0633 |
| 2020/0122043 A1* | 4/2020 | Benedetto | A63F 13/85 |
| 2020/0326199 A1* | 10/2020 | Hendrix | H04R 5/04 |
| 2021/0405998 A1* | 12/2021 | Namburu | G06F 11/3495 |
| 2021/0406047 A1* | 12/2021 | Namburu | G06F 9/453 |
| 2023/0185590 A1* | 6/2023 | Sanghai | H04L 67/535 |
| | | | 715/705 |

* cited by examiner

SYSTEM AND METHOD FOR CREATING AT LEAST ONE STEP FOR PROVIDING DIGITAL GUIDANCE TO AN UNDERLYING APPLICATION

FIELD OF THE INVENTION

The invention relates to a system and method for creating at least one step for providing digital guidance to an underlying application.

BACKGROUND OF THE INVENTION

Digital adoption platforms (DAPs) provide assistance to an end user in navigating an application or a webpage. Since it is not always feasible to provide detailed tutorials or lectures regarding how to use an application or a webpage, DAPs provide ready assistance to the end user. Further, DAPs can provide assistance asynchronously whereby presence of a tutor and an end user/learner at a same time is not required, and the end user can have multiple sessions to understand the underlying application. DAPs are designed to show navigations on a webpage by logically explaining or indicating the use and purpose of different elements in a logical manner. As an example, in a search engine, a flow would begin by first showing an input bar and explaining the functions of the input bar and then, the flow may proceed to explain the nature of a search button. In this manner, several elements are logically connected together to create a flow by which the end user can easily grasp how to use an underlying application or webpage. Thus, while providing guidance it is critical to locate and indicate an element accurately for which guidance is being provided. When the flow is being executed on the end user's system, the system would identify the elements associated with the flow and display the corresponding instructions. However, the elements in a webpage are dynamic and may change. As an example, the search bar in a search engine has different properties or different dimensions or different layout or different themes or backgrounds on different devices such as a mobile phone, a computer, a handheld tablet. In other words, contents/layout of the underlying application are modified when the underlying application is accessed on different devices. Hence, the DAP may not be able to accurately identify the elements for which guidance is to be provided.

Thus, there is a need in the art to address at least the aforementioned problems and limitations.

SUMMARY OF THE INVENTION

Accordingly, the present invention in one aspect provides a system to create at least one step for providing digital guidance to an underlying application. The system comprising one or more user devices in communication with a server, the user device comprising a processor configured to: scan the underlying application for identifying one or more elements in the underlying application; select at least one target element from the one or more elements for the step; determine at-least one neighbouring element in proximity of the target element; analyse each of the target element and each of the neighbouring element to determine attributes including unique attributes of each target element and/or neighbouring element; classify the target element or the neighbouring element as a pillar element depending upon presence of unique attributes; determine an intersection element between the target element and the pillar element, the intersection element associated with the target element and the pillar element; and determine path of the intersection element, and store path of the intersection element on the server or the user device, the path of the intersection element enables identification of the intersection element and based on the intersection element, the pillar element and the target element associated with the intersection element can be identified, thereby enabling retrieval of the target element associated with the step for providing digital guidance.

In an embodiment, the step of determining unique attributes of each target element and/or neighbouring element includes comparing attributes of the target element and the neighbouring element.

In an embodiment, the intersection element is a common parent to the target element and the pillar element.

In an embodiment, the processor is configured to determine whether the pillar element is a parent or child of the target element.

In another aspect, the present invention provides a method to create at least one step for providing digital guidance to an underlying application, the method comprising the steps of scanning the underlying application for identifying one or more elements in the underlying application; selecting at least one target element from the one or more elements for the step; determining at-least one neighbouring element in proximity of the target element; analysing each of the target element and each of the neighbouring element to determine attributes including unique attributes of each target element and/or neighbouring element; classifying the target element or the neighbouring element as a pillar element depending upon presence of unique attributes; determining an intersection element between the target element and the pillar element, the intersection element associated with the target element and the pillar element; and determining path of the intersection element, and store path of the intersection element on the server or the user device, the path of the intersection element enables identification of the intersection element and based on the intersection element, the pillar element and the target element associated with the intersection element can be identified, thereby enabling retrieval of the target element associated with the step for providing digital guidance.

In an embodiment, the intersection element is a common parent to the target element and the pillar element.

In an embodiment, the method comprises the step of determining whether the pillar element is a parent or child of the target element.

BRIEF DESCRIPTION OF THE DRAWINGS

Reference will be made to embodiments of the invention, examples of which may be illustrated in accompanying figures. These figures are intended to be illustrative, not limiting. Although the invention is generally described in context of these embodiments, it should be understood that it is not intended to limit the scope of the invention to these particular embodiments.

DETAILED DESCRIPTION OF THE INVENTION

The present invention is directed towards a system and method for creating at least one step for providing digital guidance to an underlying application. The step can be one of plurality of steps that form a flow that guides end-users accurately to elements of the underlying application even when contents/layout of the underlying application are modified.

In an embodiment, the step is created on a digital adaption/guidance platform installed on a system. The digital guidance platform is designed to support an end user with an underlying application. This may include new user onboarding, continuous training, self-serve contextual support, assistance with data field validation, and application change management. The platform technology may include omni-channel integrations (such as integrating with knowledge systems, bases and repositories), workflow automation, in-place answers, workflow analytics, and content authoring.

Examples of the underlying applications include enterprise applications, custom applications, and end user applications. In some embodiments, the digital guidance platform may take the form of a simple web browser extension or a dedicated application. Developers of an application may use the extension or the application to provide guided navigation to users of the underlying application so that the users can quickly learn how to use the application. The user's training and/or support experience can be enhanced with walk-throughs, smart pop-ups and tool-tips provided by the platform. These platform tools may be configured to show up based on a particular user's role and current location.

Figure 1:
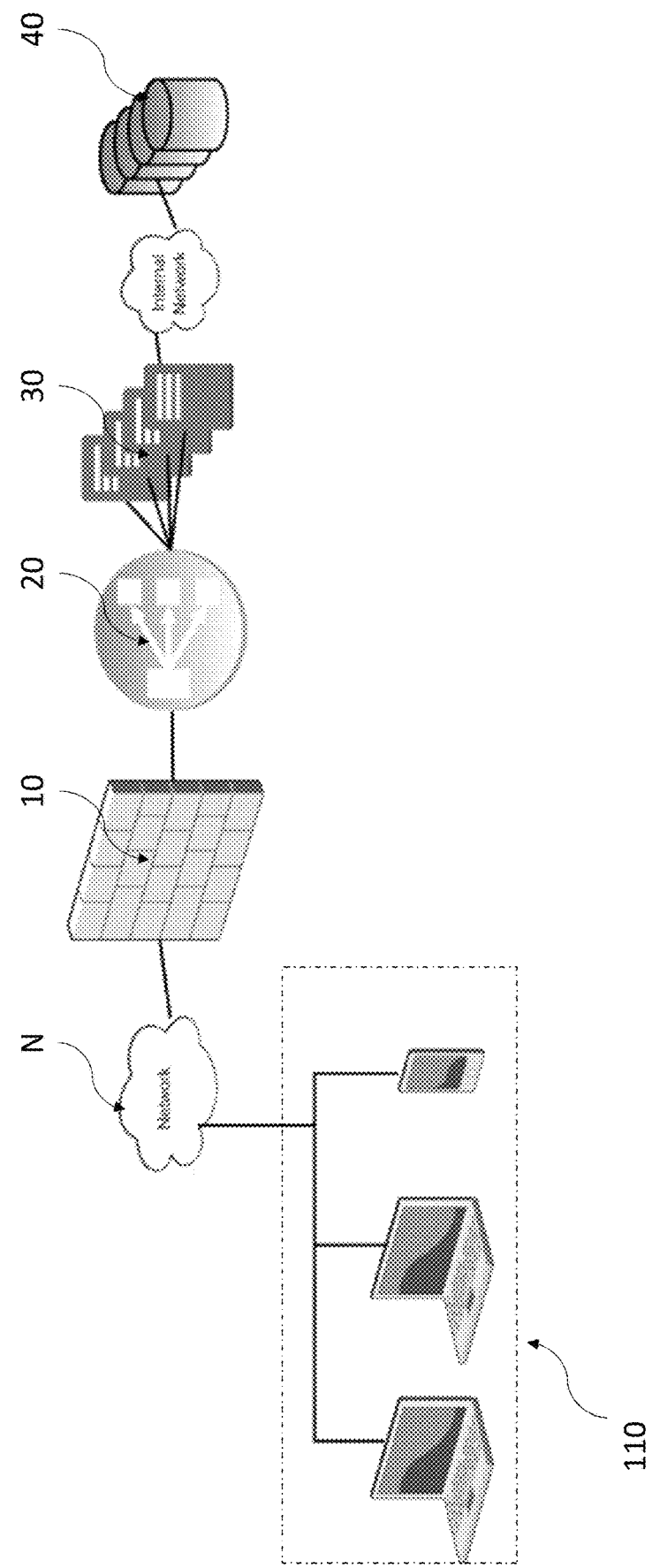
FIG. 1 shows a block diagram of a system for creating at least one step for providing digital guidance to an underlying application in accordance with an embodiment of the invention.

FIG. 1 shows a system 100 for creating at least one step for providing digital guidance to an underlying application in accordance with an embodiment of the invention. The system 100 comprises one or more user devices 110, a server 40 and a network N. The user devices 110 can be selected from any electronic device such as a computer, a laptop, a tablet, a handheld or mobile device, etc. The user devices 110 comprises one or more processors, a memory, a storage unit, a communication module, a display/interactive display, input/output units etc. The user devices 110 through the communication module communicates over the network N and connect with the server 40. The network N can be a wired network and/or a wireless network having variety of network devices such as routers, bridges, modems and the like, and the communication module of the user devices 110 is selected and configured based on the network requirements. The network N can be implemented as intranet, local area network (LAN), wide area network (WAN), the internet, and the like using different protocols, for example Hypertext Transfer Protocol (HTTP), Transmission Control Protocol/Internet Protocol (TCP/IP), Wireless Application Protocol (WAP), and the like.

As discussed hereinbefore, the step is created on a digital guidance platform installed on the system 100. In this regard, the digital guidance platform is installed on the storage unit of the user device 110. The digital guidance platform can be accessed through user interface of the user device 110. The digital guidance platform may include a content creation/authoring module (also referred to as an editor) and a content playback/training module. The modules may reside on the user devices 110 or on the server 40. The modules may also take form of a simple web browser extension or may be downloaded to the user device 110. The user device 110 for content creation and content playback can be the same or different devices. The user device 110 for content creation i.e. creating the step for digital guidance is operated by a content creator, and the user device 110 can then be operated by an end user who accesses the underlying application over which the step/flow for digital guidance has been created.

In an embodiment, the content authoring module allows a content author to create digital guidance for end users of an underlying application. The creation of steps begins by an author accessing/opening the underlying application for which the author wants to create the steps, and then launching the digital guidance platform. All the elements in the underlying application are scanned. In this regard, a DOM (Document Object Model) structure of the page of the underlying application is accessed. As is known in the art, DOM is an interface that has information on the elements of a webpage. The elements in the DOM exist in a hierarchical tree like structure with each element being a node The elements could range from a picture, a clickable hyperlinked text, button, dropdown, input, forms, videos, text-area, radio-button, charts, text, icons, date-picker, menu-items, search bar, header, paragraph, table, rows, columns and all other HTML elements. Each element can have one or more attributes. Attributes of the said elements refer to the properties and characteristics the elements possess such as name, ID, data-automation-id, name, class, style, label, aria-label, tooltip-text, role, content, src and all other custom attributes that can be defined. In an embodiment, at-least one target element is determined/selected for each step of the flow. The target element is selected by the content creator. For the target element selected/determined, all properties/attributes of the target element are determined and captured. Further, element hierarchy of the target element are also determined. Further, at-least one neighboring element in proximity of the target element is determined. For the neighboring element as well, the attributes of the element are determined. Once the target element and the neighboring element are determined, the target element and the neighboring element are analyzed to determine whether the target element and the neighboring element have unique attributes. The unique attribute is an attribute that is present only in the underlying application/HTML page. While there are unique attributes for elements (e.g., the "id" attribute), these are not mandatory, and many applications may not define distinct values for the attributes. The system 100 scans all the attributes defined in all the elements in the page of the underlying application and finds attributes which are unique to an element i.e., no other element in the page contains the same value for that attribute. Such attributes are considered as unique attributes. In an embodiment, determining unique attributes of each target element and/or neighboring element includes comparing attributes of the target element and the neighboring element. Thereafter, at-least one of the target element or the neighboring element having the unique attribute is classified as a pillar element. The pillar element is thus an element having at-least one unique attribute. Accordingly, the target element can be a pillar element or the neighboring element can be a pillar element. In case, the neighboring element is a pillar element, the pillar element can be a parent or a child of the target element.

Accordingly, each step of the flow is associated with at-least one target element and one pillar element. Thereafter, an intersection element between the target element and the pillar element is determined. In an embodiment, the intersection element is a common parent to the target element and the pillar element. Once, the intersection element is determined, path of the intersections element is determined and stored on the system 100. Since the intersection element is the common parent to the target element and the pillar element, the intersection element enables identification of the pillar element as well as the target element. For path of the intersection element, distance from pillar element, and depth of the target element is determined. Distance is the number of edges between two HTML nodes and depth is the number of edges between source element and root element (body or document). Based on the distance from the pillar element and depth of the target element, path of the intersection element is determined, whereby the path represents the position of the intersection element with the tree structure relative to another element.

In an embodiment, the steps/flow created on the user device 110 is stored on the user device 110 or the server 40. Further, the step or the flow may be associated with corresponding instructions for providing digital guidance. In this regard, path of the intersections element for the step is determined and stored on the user device 110 or the server 40. Further, as shown in the figure, access to the server 40 is secured by a firewall 10 and a load balancer 20 that distributes the incoming request to an API server node which stores the data (i.e., the steps/flow) on the server 40.

As discussed hereinbefore, the content playback/training module provides digital guidance to end users of an underlying application. Accordingly, when the content playback/training module is executed on the user device 110, the step or steps for which digital guidance has been created are retrieved. The path of the intersection element enables identification of the intersection element and based on the intersection element, the target element and/or the pillar element is retrieved. The target element associated with the step for providing digital guidance is thus retrieved. Accordingly, even if the content/layout of the underlying applications changes causing a change in the target element, the present invention determines the target element through path of the intersection element. Thus, the end-users are guided accurately to the target element of the underlying application even when contents/layout of the underlying application are modified.

Figure 2:
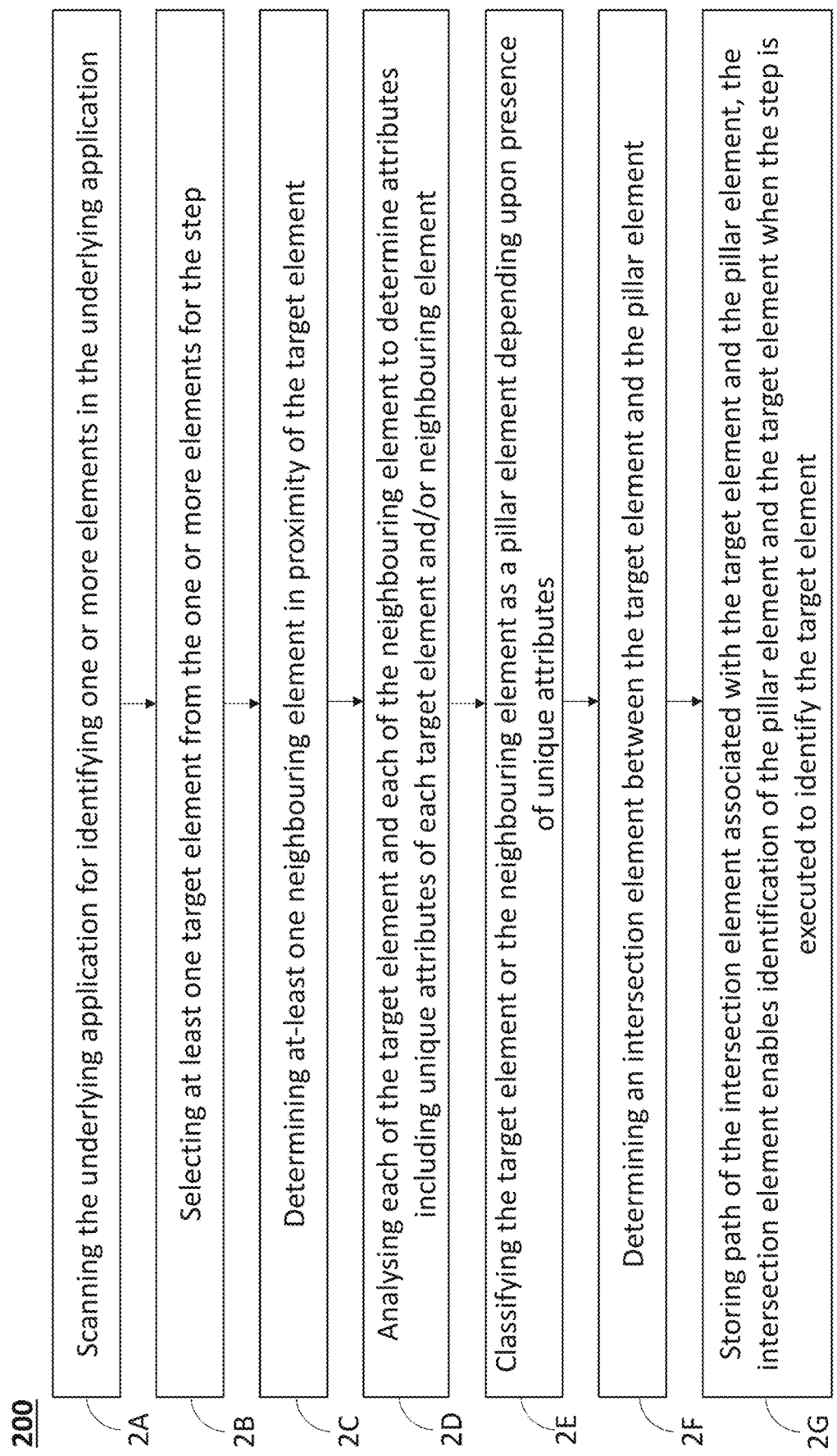
FIG. 2 shows a flow diagram of a method for creating at least one step for providing digital guidance to an underlying application in accordance with an embodiment of the invention.

FIG. 2 shows a flow diagram of a method for creating at-least one step for providing digital guidance to an underlying application in accordance with an embodiment of the invention. In order to perform such a method 200, a system such as the system 100 shown in FIG. 1 may be used. As discussed hereinbefore, the creation of steps in a flow begins by an author accessing/opening the underlying application for which the content creator wants to create the steps in the flow. The method 200 begins at step 2A, where the underlying application is scanned for identifying one or more elements in the underlying application. All the elements in the underlying application are scanned. In this regard, a DOM (Document Object Model) structure of the page of the underlying application is accessed. As is known in the art, DOM is an interface that has information on the elements of a webpage. The elements in the DOM exist in a hierarchical tree like structure with each element being a node. The elements could range from a picture, a clickable hyperlinked text, button, dropdown, input, forms, videos, text-area, radio-button, charts, text, icons, date-picker, menu-items, search bar, header, paragraph, table, rows, columns and all other HTML elements. Each element can have one or more attributes. Attributes of the said elements refer to the properties and characteristics the elements possess such as name, ID, data-automation-id, name, class, style, label, aria-label, tooltip-text, role, content, src and all other custom attributes that can be defined. At step 2B, the method 200 allows selection of at least one target element from the one or more elements for the step. The target element is selected by the content creator. For the target element all properties/attributes of the target element are determined. Further element hierarchy of the target element are also determined. At step 2C, the method 200 determines at-least one neighboring element in proximity of the target element. For the neighboring element as well, the attributes of the element are determined. Once the target element and the neighboring element are determined, the target element and the neighboring element are analyzed at step 2D to determine whether the target element and the neighboring element have unique attributes. The unique attribute is an attribute that is present only in the underlying application/HTML page. While there are unique attributes for elements (e.g., the "id" attribute), these are not mandatory, and many applications may not define distinct values for the attributes. The system 100 scans all the attributes defined in all the elements in the page of the underlying application, and finds attributes which are unique to an element (i.e. no other element in the page contains the same value for that attribute). Such attributes are considered as unique attributes. In an embodiment, determining unique attributes of each target element and/or neighboring element includes comparing attributes of the target element and the neighboring element. Thereafter, the method 200 at step 2E classifies at-least one of the target element or the neighboring element having the unique attribute as a pillar element. The pillar element is thus an element having at-least one unique attribute. Accordingly, the target element can be a pillar element or the neighboring element can be a pillar element. In case, the neighboring element is a pillar element, the pillar element can be a parent or a child of the target element.

Accordingly, each step of the flow is associated with at-least one target element and one pillar element. The method 200 at step 2F, determines an intersection element between the target element and the pillar element. In an embodiment, the intersection element is a common parent to the target element and the pillar element. Once, the intersection element is determined, path of the intersections element is identified and stored on the system 100 at step 2G. Since the intersection element is the common parent to the target element and the pillar element, the intersection element enables identification of the pillar element as well as the target element. For path of the intersection element, distance from pillar element, and depth of the target element is determined. Distance is the number of edges between two HTML nodes and depth is the number of edges between source element and root element (body or document). Based on the distance from the pillar element and depth of the target element, path of the intersection element is determined, whereby the path represents the position of the intersection element with the tree structure relative to another element.

Once the step for digital guidance is created and stored, it may be accessed or played back by an end-user. Further, the step or the flow may be associated with corresponding instructions for providing digital guidance. For each step, the target element and the pillar element path are determined through the path of the intersection element. The path of the intersection element enables identification of the intersection element and based on the intersection element, the target element and/or the pillar element is retrieved. The target element associated with the step for providing digital guidance is thus retrieved. Accordingly, even if the content/layout of the underlying applications changes causing a change in the target element, the present invention determines the target element through path of the intersection element. Thus, the end-users are guided accurately to the target element of the underlying application even when contents/layout of the underlying application are modified.

Advantageously, the present invention through the pillar element enables identification of elements of a page even when contents/layout of the underlying application are modified, thereby guiding end-users accurately.

While the present invention has been described with respect to certain embodiments, it will be apparent to those skilled in the art that various changes and modification may be made without departing from the scope of the invention as defined in the following claims.

We claim:

1. A system (100) for creating at least one step for providing digital guidance to an underlying application, the system (100) comprising:
    one or more user devices (110) in communication with a server (40), the user device (110) comprising a processor configured to:
        scan the underlying application for identifying one or more elements in the underlying application;
        select at least one target element from the one or more elements for the step;
        determine at-least one neighbouring element in proximity of the target element;
        analyse each of the target element and each of the neighbouring element to determine attributes including unique attributes of each target element and/or neighbouring element;
        classify the target element or the neighbouring element as a pillar element depending upon presence of unique attributes;
        determine an intersection element between the target element and the pillar element, the intersection element associated with the target element and the pillar element; and
        determine path of the intersection element, and store path of the intersection element on the server (40) or the user device (110), the path of the intersection element enables identification of the intersection element and based on the intersection element, the pillar element and the target element associated with the intersection element can be identified, thereby enabling retrieval of the target element associated with the step for providing digital guidance.

2. The system (100) as claimed in claim 1, wherein the step of determining unique attributes of each target element and/or neighbouring element includes comparing attributes of the target element and the neighbouring element.

3. The system (100) as claimed in claim 1, wherein the intersection element is a common parent to the target element and the pillar element.

4. The system (100) as claimed in claim 1, wherein the processor is configured to determine whether the pillar element is a parent or child of the target element.

5. The system (100) as claimed in claim 1, wherein path of the intersection element is determined based on distance from the pillar element and depth of the target element.

6. A method (200) for creating at least one step for providing digital guidance to an underlying application, the method (200) comprising the steps of:
    scanning the underlying application for identifying one or more elements in the underlying application;
    selecting at least one target element from the one or more elements for the step;
    determining at-least one neighbouring element in proximity of the target element;
    analysing each of the target element and each of the neighbouring element to determine attributes including unique attributes of each target element and/or neighbouring element;
    classifying the target element or the neighbouring element as a pillar element depending upon presence of unique attributes;
    determining an intersection element between the target element and the pillar element, the intersection element associated with the target element and the pillar element; and
    determining path of the intersection element, and store path of the intersection element on the server (40) or the user device (110), the path of the intersection element enables identification of the intersection element and based on the intersection element, the pillar element and the target element associated with the intersection element can be identified, thereby enabling retrieval of the target element associated with the step for providing digital guidance.

7. The method (200) as claimed in claim 6, wherein the intersection element is a common parent to the target element and the pillar element.

8. The method (200) as claimed in claim 6 comprising the step of determining whether the pillar element is a parent or a child of the target element.

9. The method (200) as claimed in claim 6, wherein path of the intersection element is determined based on distance from the pillar element and depth of the target element.

* * * * *